United States Patent [19]

Sing et al.

[11] 4,419,691
[45] Dec. 6, 1983

[54] METHOD FOR THE IMPROVED REPRODUCTION OF IMAGE IN REPRODUCTION TECHNOLOGY

[75] Inventors: Gerhard Sing, Schonkirchen; Klaus Wellendorf, Kitzeberg b. Kiel, both of Fed. Rep. of Germany

[73] Assignee: Dr. -Ing. Rudolf Hell GmbH, Fed. Rep. of Germany

[21] Appl. No.: 302,421

[22] PCT Filed: Jan. 17, 1981

[86] PCT No.: PCT/DE81/00016
§ 371 Date: Sep. 16, 1981
§ 102(e) Date: Sep. 16, 1981

[87] PCT Pub. No.: WO81/02206
PCT Pub. Date: Aug. 6, 1981

[30] Foreign Application Priority Data

Jan. 26, 1980 [DE] Fed. Rep. of Germany ....... 3002781

[51] Int. Cl.³ .............................................. H04N 1/40
[52] U.S. Cl. ......................................... 358/75; 358/80
[58] Field of Search ..................................... 358/75, 80

[56] References Cited
U.S. PATENT DOCUMENTS 3,849,592 11/1974 Rosenheck .
3,922,484 11/1975 Keller .
4,075,663 2/1978 Wellendorf .
4,084,196 4/1978 Tisue et al. .
4,124,870 11/1978 Schatz et al. .
4,150,400 4/1979 Wong .

Primary Examiner—Michael A. Masinick
Attorney, Agent, or Firm—Hill, Van Santen, Steadman & Simpson

[57] ABSTRACT

Refined recording of line contours in electronic reproduction technology, whereby the recording takes place by means of several selectively drivable recording beams within a raster point with finer resolution than the scanning. The control signals for the individual beams are obtained from the density values of the surroundings of the raster point to be recorded which are stored during the scanning.

4 Claims, 6 Drawing Figures

METHOD FOR THE IMPROVED REPRODUCTION OF IMAGE IN REPRODUCTION TECHNOLOGY

BACKGROUND OF THE INVENTION

1. Field of the Invention

The invention concerns a method for the improved image reproduction in reproduction technology, in particular in form manufacture.

2. Description of the Prior Art

For the obtaining of the color separations for multicolor printing, besides the classical method by means of cameras for copying work, to an increasing degree electronic devices are being used for the production of color separations, so-called scanners are used which undertake the color correction and the raster breakdown of the images or, respectively, of entire pages, which is necessary for the printing. Very often in such images or pages there are line drawings like scripts, edge cross pieces, signets, separation signs, frames etc. If one were simply to put such line drawing elements into the raster together with the half-tone images, then by means of the rastering at specific contours, a step-like distortion of the smooth line contours in the original would arise which in the printed reproduction has an unacceptably disturbing effect. Today customarily one obtains the color separations in such a manner than one only rasters the half-tone images in electronic devices or cameras. These half-tone separations are then mounted together with a film which carries the unrastered line drawing. From this mounting, on a third film, an intermediate negative is produced. This is again copied and provides a color separation which now bears the combination of rastered half-tone images and unrastered line drawings and is utilized for the production of forms. One is thus compelled to use this method which is expensive in terms of material and time, which in addition because of the many copying processes brings with it still a significant uncertainty in the total method if one wants to preserve the smooth contours of the line drawing in the rastered half-tone images all the way to the form.

One could indeed improve the line reproduction in the electronic devices in that one scans and records items of information, half-tone and line images, with multiple line fineness, for example, 2 to 3 times. However, in the case of the pre-given writing velocity, the processing time would rise proportionally with the refinement, which is also not acceptable for the practical operation. Besides this, in the case of the storage of entire images, an increased storage requirement arises.

SUMMARY OF THE INVENTION

The present invention is based upon the problem of avoiding the indicated disadvantages and of stating a method which operates with improved image reproduction in the case of the production of forms and particular in printing technology or textile printing technology.

In an electronic device for the production of color separations, according to the invention, simultaneously with scanning of the half tone images from a particular original or in the case of outputting from an electronic image memory, the line drawing information is scanned and specifically with the same line fineness as the half tone image. The scanning values of the line information are however according to the invention fed to a circuit which stores the contents of several neighbouring scanning lines and in each scanning point, by means of comparison with the surroundings of the point, obtains refined intermediate values.

A possibility of the obtaining of intermediate values is described for example in U.S. Pat. No. 4,075,663 which is hereby incorporated by reference.

These values are fed to a recording element which has several selectively drivable recording beams. To such a recording element (for example described in German Pat. No. 2,107,738 which corresponds to U.S. Pat. No. 3,725,574), which is customarily used for half tone recording for the depiction of different sized and differently shaped raster points, by means of the invention the improved line information is supplied in such a manner that it is blended into the rastered half tone information. The line fineness of the line information may thereby nevertheless be coarser than the resolution which is used for the depiction of the half tone raster points. In an advantageous manner, for the depiction of the raster points, one can use, for example, 6 selectively driven recording beams within a writing line, which one uses individually for the line recording or combines in pairs, so that for the line recording, 6 or 3 times the line fineness of the half tone recording raster results. For less high requirements, still a combination of $2 \times 3$ recording beams can be advantageous which in the line recording corresponds to a doubling of the fineness of the half tone raster.

When for other printing methods, almost exclusively the recording of line drawings is undertaken (for example, in textile printing), of course, the process of the blending into a rastered half tone image drops out; however, the inventively refined recording of the line information can proceed analogously within time loss.

BRIEF DESCRIPTION OF THE DRAWINGS

The invention will be described more precisely in the following with the use of the FIGS. 1 through 6.

DESCRIPTION OF THE PREFERRED EMBODIMENTS

Figure 1:
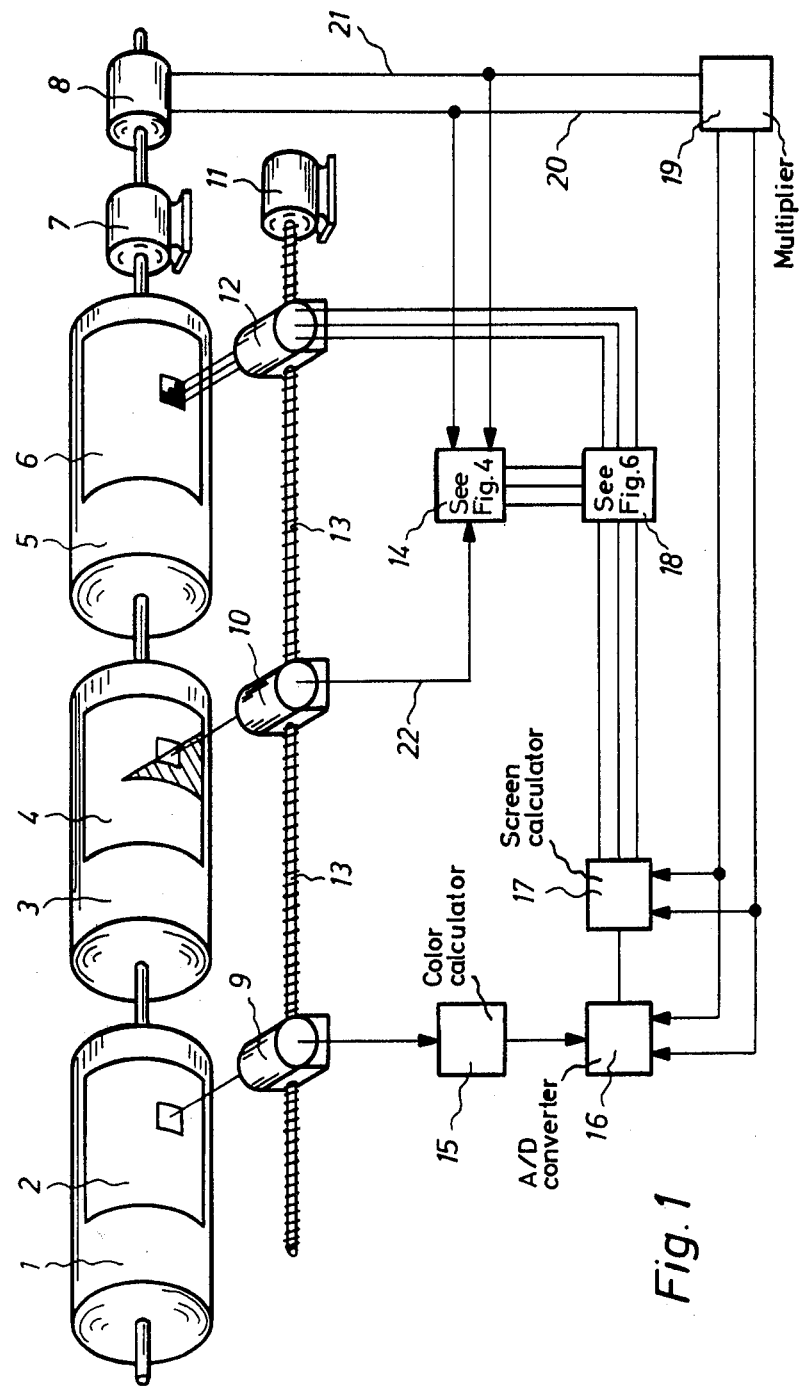
FIG. 1 shows a schematic depiction of the introduction of the inventive arrangement into the basic structure of an electronic device for the production of color separations.

FIG. 1 shows the principle of an electronic device for the production of color separations in which a circuit 14 is drawn upon for the refinement of the line recording according to the invention. Such a device consists of a scanning cylinder 1 which bears the half tone information 2. A further scanning cylinder 3 bears the line information 4. On a further cylinder 5, the combined color-corrected and rastered output product 6 is recorded in the form of a color separation for the further processing for the production of the form. This can occur, for example, by means of light beams on light-sensitive film. All three cylinders 1, 3, 5 are driven with the same speed of rotation by a motor 7. Arranged in front of the cylinder 1 is a scanning element 9 for the scanning of the half tone information 2, arranged in front of the cylinder 3 is a scanning element 10 for the scanning of the line information 4. In front of the recording cylinder 5 there is arranged a recording element 12. The scanning elements 9 and 10 as well as the recording element 12 by means of the spindle 13 which is driven by the motor 11 carry out a forwarding motion axial to the cylinders. From the interplay between rotary movement, forwarding movement and a clock pulse generator 8 arranged with the cylinder 1, 3, 5 on the same shaft, there results the scanning raster and the half tone recording raster. Besides the raster clock pulse, the clock pulse generator 8 also generates a pulse which indicates the beginning of each circumferential line. Both clock pulses are supplied via lines 20 or, respectively, 21 to a multiplier 19 which prepares the clock pulse for a raster computer 17 in which, corresponding to the scanning values of the half tone raster 9, form and size of the raster points to be recorded are generated. The scanning values from the scanning element 9 first pass through an analog color computer 15 which undertakes the color correction. The raster computer 17 operates digitally. Therefore, the values corrected in the color computer 15 are first digitalized in an analog-digital transducer 16. The raster clock pulse from line 20 as well as the clock pulse for the line beginning from line 21 are further also fed to the circuit 14 of which a circuitry example is explained more precisely with the use of FIG. 4.

In modern electronic devices for the production of color separations, size and form of the half tone raster points are generated in the raster computer 17 and recorded by means of several separately drivable writing beams, as for example, is described in German Pat. No. 2,107,738 and German Pat. No. 1,901,101 which corresponds to U.S. Pat. No. 3,657,472. Because of the complicated and varied structure of the half tone raster points, as a rule thereby the number of the writing beams in a scanning line width is higher than would be necessary for the inventive refinement of the line reproduction.

The circuit 18 in which raster information and line information converge in an advantageous manner thus contains logic switching elements which, in the case of blending in of line information, combine the writing beams in groups, for example, three groups for two writing beams each or two groups for three writing beams each. Also, reversible grouping is possible for different uses.

Figure 2:
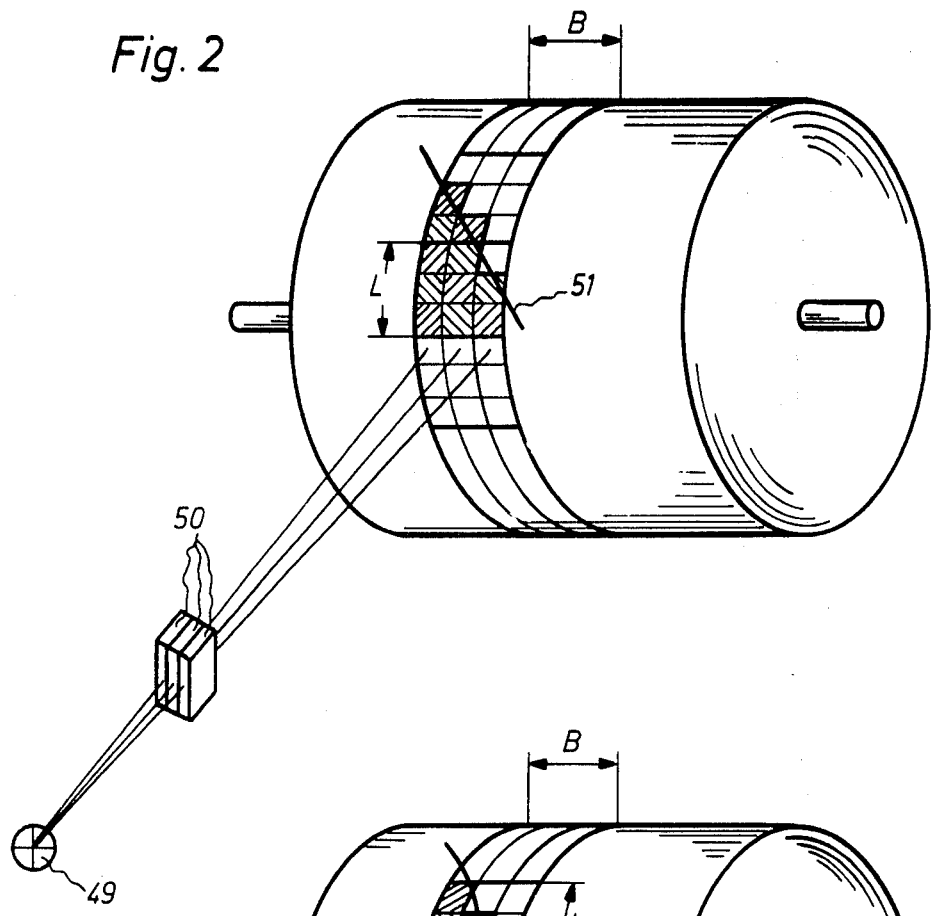
FIGS. 2 and 3 show examples of the refinement at different contours.
Figure 3:
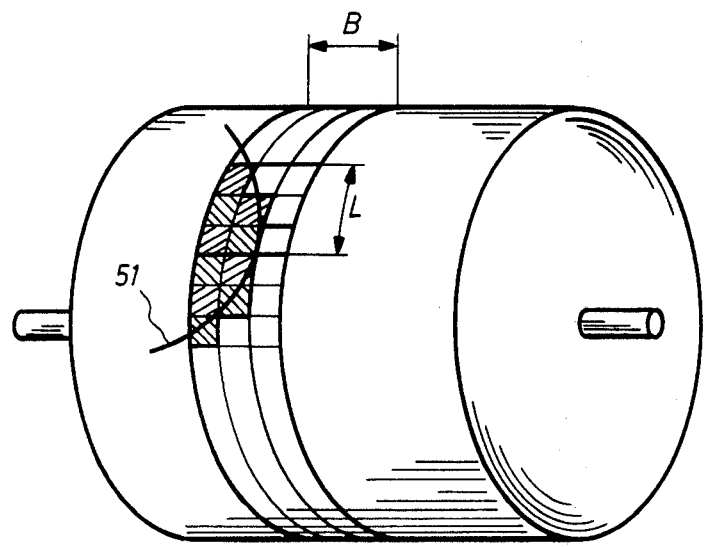

FIGS. 2 and 3 clarify with differently shaped contours 51 how the refinement of the line recording comes about. Here for example, within a writing line width B there are arranged three recording beams which can be driven separately. Thereby, the individual beams in an advantageous manner can consist of groups of combined recording beams, of a multi-beam recording device for the depiction of half tone raster points, as is described for example in German Pat. No. 2,107,738. These recording beams can for example, be driven three times by the circuit 14 onto the length of a half tone raster point interval L in circumferential direction so that in a raster mesh B×L, nine fields can be acted upon separately. One recognizes that the contour forms 51 selected randomly as an example in FIGS. 2 and 3 are refined by means of specific point patterns within each raster field B×L in the sense of the invention. In FIG. 2, also for the clarification, three light modulators 50 and the light source 49 are drawn in.

Figure 4:
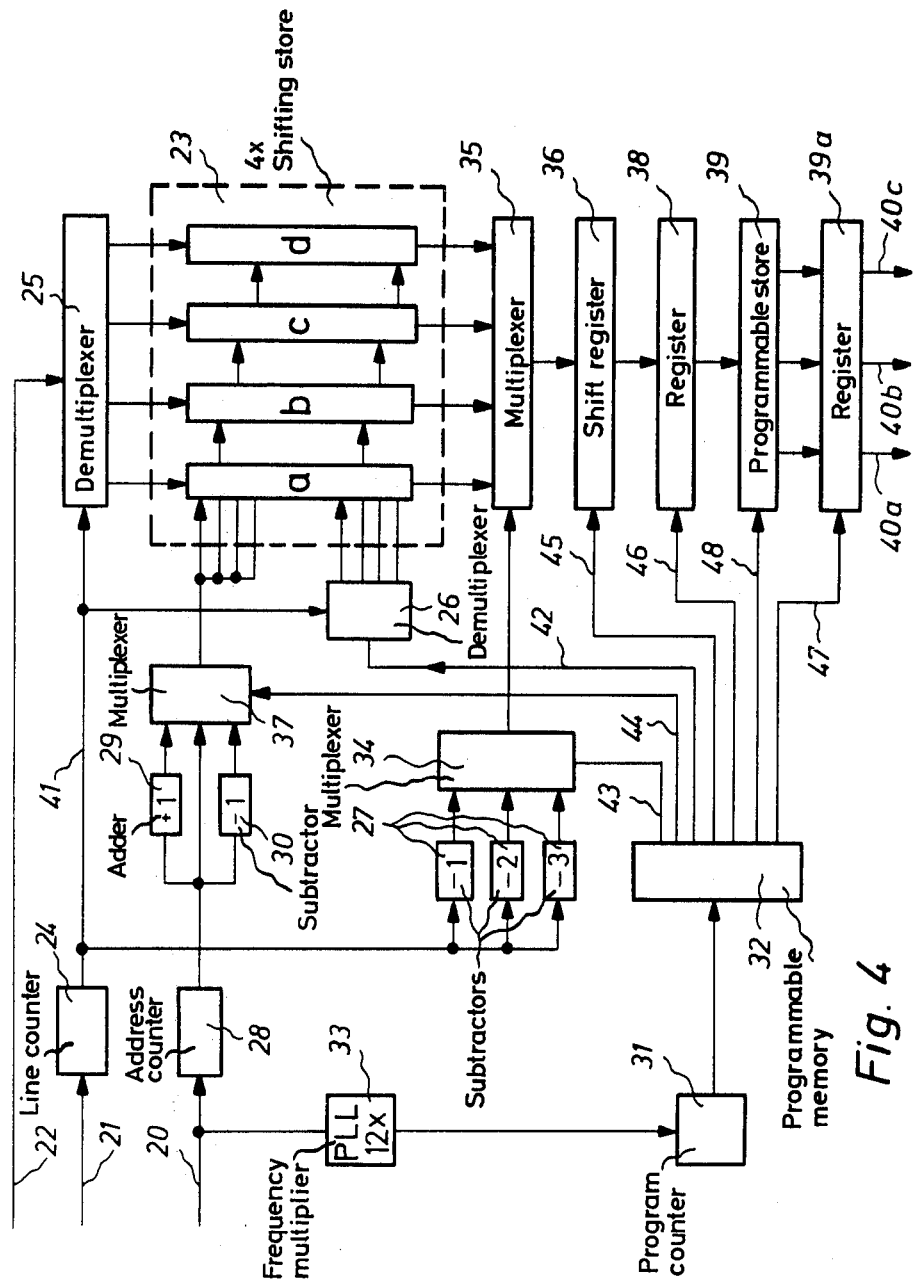
FIG. 4 shows an example for a circuit for the refinement of line recording.

With the use of FIG. 4, an example is described for the circuit 14 (FIG. 1) for the obtaining of the point patterns from the items of information of the specific surroundings of the point in the case of line recording. The circuitry example again proceeds from the assumption that a raster mesh (B×L in FIG. 2) is sub-divided into 3×3 individual fields. The principle manner of operation is the following: The line information from the line scanner 10 (FIG. 1) proceeds via line 22 and a demultiplexer 25 into a quadruplex reciprocal memory 23a–d which stores the value in each case of four consecutive scanning lines in such a manner that in each memory portion, there is one scanning line. Three portions of the memory hold the surrounding information of the point to be evaluated in readiness, while in the fourth portion, the next scanning line is written in. The information of the surroundings of the point, which is available in the three memories in each case loaded with neighbouring image lines, is associated via read-only memory 39 with a specific pattern of the point to be written by the recording element 12. The read only memory 39 is programmed such that this point pattern is optimally appropriate to the contour detected by the scanning and its reproduction is refined in the inventive form.

A line counter 24, (for example SN 74293 of the Firm Texas Instruments) controls via 2-bit line 41 the cyclic change-over of the reciprocal memory 23a–d (for example 4 x SEMI 4200 of the Firm Electronic Memories and Magnetics), whereby via a demultiplexer 25 (for example SN 74139 of the Firm Texas Instruments) it determines into which portion of the reciprocal memory the line information is read in. It further controls the reading pulse which comes from the control unit via line 42, which it switches on via a further demultiplexer 26 (for example SN 74130 of the Firm Texas Instruments) corresponding to the reciprocal memory. Simultaneously, the line counter 24 via three subtractors 27 (for example, S.N. 7482 of the Firm Texas Instruments) which constantly substract by 1, 2 or, respectively 3 and via a multiplexer 34 (for example, SN 74153 of the Firm Texas Instruments) make available the addresses for those lines from which read-out is permitted. The address counter 28 (for example 3 x SN 74293 of the Firm Texas Instruments) which is driven via line 20 by the clock pulse generator 8 (FIG. 1) with the scanning pulse, together with an adder 29 (for example 3 x SN 74283 of the Firm Texas Instruments), which constantly adds by 1 and a subtractor 30 (for example 3 x SN 74283 of the Firm Texas Instruments) which constantly subtracts by 1 prepares the three point addresses from which read-out can occur.

Figure 5:
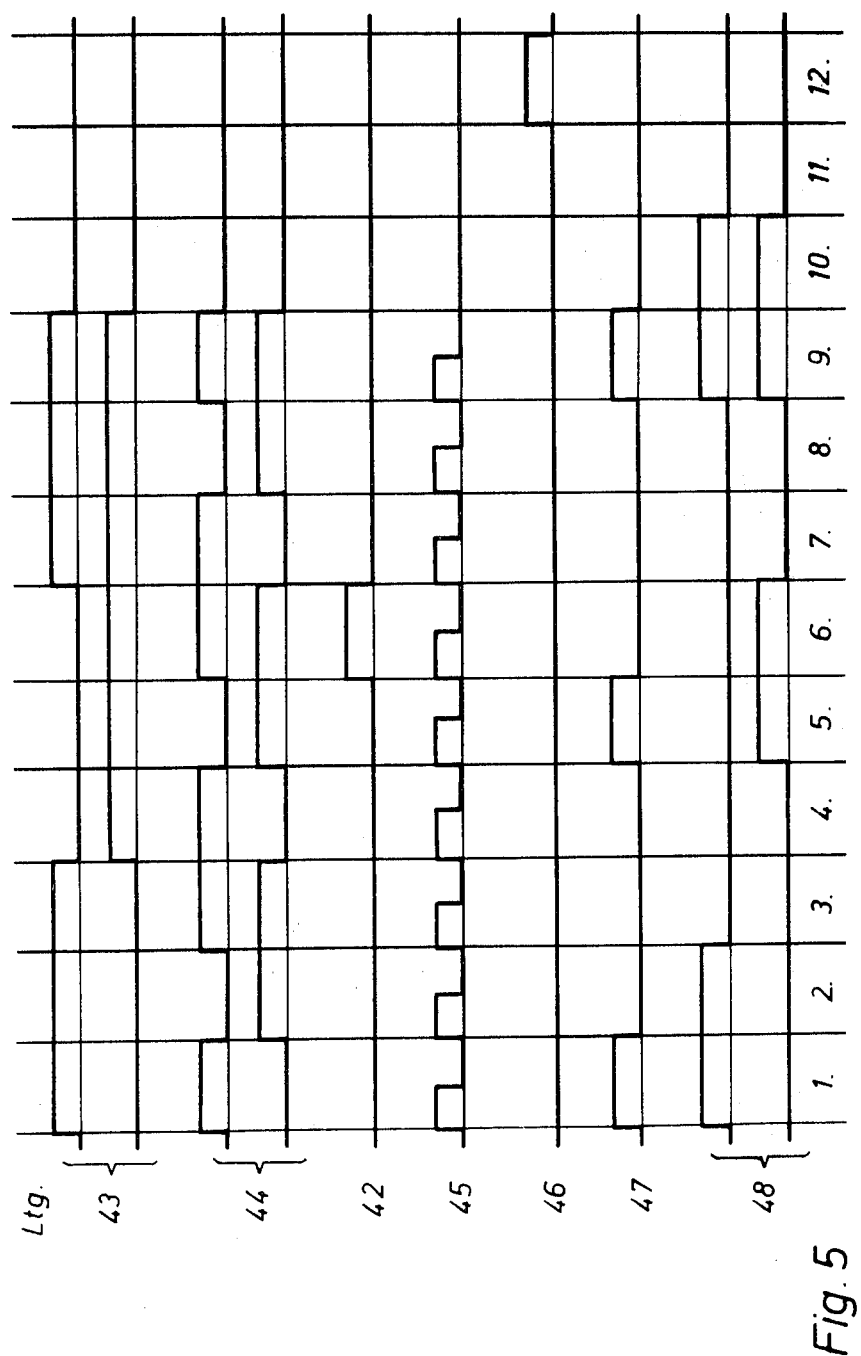
FIG. 5 shows a pulse diagram of the control system.

The controlling is laid out for linear program flow and consists of a program counter 31 (for example, SN 7492 of the Firm Texas Instruments) and a programmable memory 32 (for example 2 x SN 74188 of the Firm Texas Instruments). This contains the micro-program for the controlling, whose pulse diagram is depicted in FIG. 5. The clocking of the control unit occurs with a multiplying of the sanning frequency (here, for example, by 12 times), which is generated via a frequency multiplier 33 in PLL circuit (for example, described in RCA application report ICAN 6101).

The factor 12 makes available to the control unit 12 program steps for the duration of a scanning clock pulse. In the course of these program steps, the control unit via line 43 (2 bits) connects via the multiplexer 34, one after the other, the three reciprocal memory portions, which just contain the complete neighbouring line information, via a further multiplexer 35 (for example SN 74153 of the Firm Texas Instruments) to a shift register 36 (for example 3 x SN 7495A) and within each line via line 44 (2 bit) via a multiplexer 37 (for example 3 x 74153 of the Firm Texas Instruments) selects three points so that at the input of the shift register 36, one after the other, nine items of point information appear. The control unit via line 45 for each point information delivers a pulse which causes the shift register to shift so that after the nine shifts, the information is present in parallel at the output of the shift register. Via line 46, the control unit provides to a postconnected register 38 for example, 2 x SN 74174 of the Firm Texas Instruments) with a charge pulse so that the 9 bit information is taken over into the register 38 in order there to be ready for the next-following scanning duration for the generation of the point pattern, while the shift register 36 becomes free for the collecting of the next information. The information stored in the register 38 together with a 2 bit item of information, which comes via line 48 from the control unit, forms the address for the programmable memory 39. Thereby for the duration of the writing clock pulse for an entire point (B×L), the address portion which comes from the register 38 remains constant while the address portion which comes from the control unit via line 48 is reversed within a point three times. Thus, the point to be written is resolved also in circumferential direction in three lines, whereby the refinement becomes effective also in circumferential direction. After intermediate storage by means of a pulse on line 47 in a further register 39a (for example type 74175 SN 74175 of the Firm Texas Instruments), a drive signal for the circuit 18 (FIG. 1) stands ready at its outputs 40a-c.

For the program example stated, in FIG. 5, for the clarification, a pulse diagram is stated which shows the timerelated course of the output pulses from the programmable memory 32.

Program counter 31 operates in conjunction with the other units to control how the individual program steps are to occur. The following operation occurs with the circuit of FIG. 4. Each basic timing signal from line 20 at which a basic timing signal occurs is converted into 12 intermediate timing signals by the PLL circuit 33. The program counter 31 divides the output clocks by the PLL circuit into blocks of respectively 12 subclocks and it counts up from 1 through 12 each time and then again counts from 1 through 12. The output clocks of the program counter 31 serve as input addresses for the memory 32, i.e., the addresses 1, 2, etc., through 12 successively are supplied to the memory 32.

The signals illustrated in FIG. 5 for the lines 42 through 48 which correspond to the individual program steps 1 through 12 are deposited in the memory 32. When the program counter 31, for example, supplies the address 1, then the signals of the first column of FIG. 5 are emitted to the corresponding output lines. Upon application of address 2, the signals of the second column are read out, etc. The sequence of how the individual program steps are then executed with the assistance of the multiplexers 34 and 37 is as described above.

Figure 6:
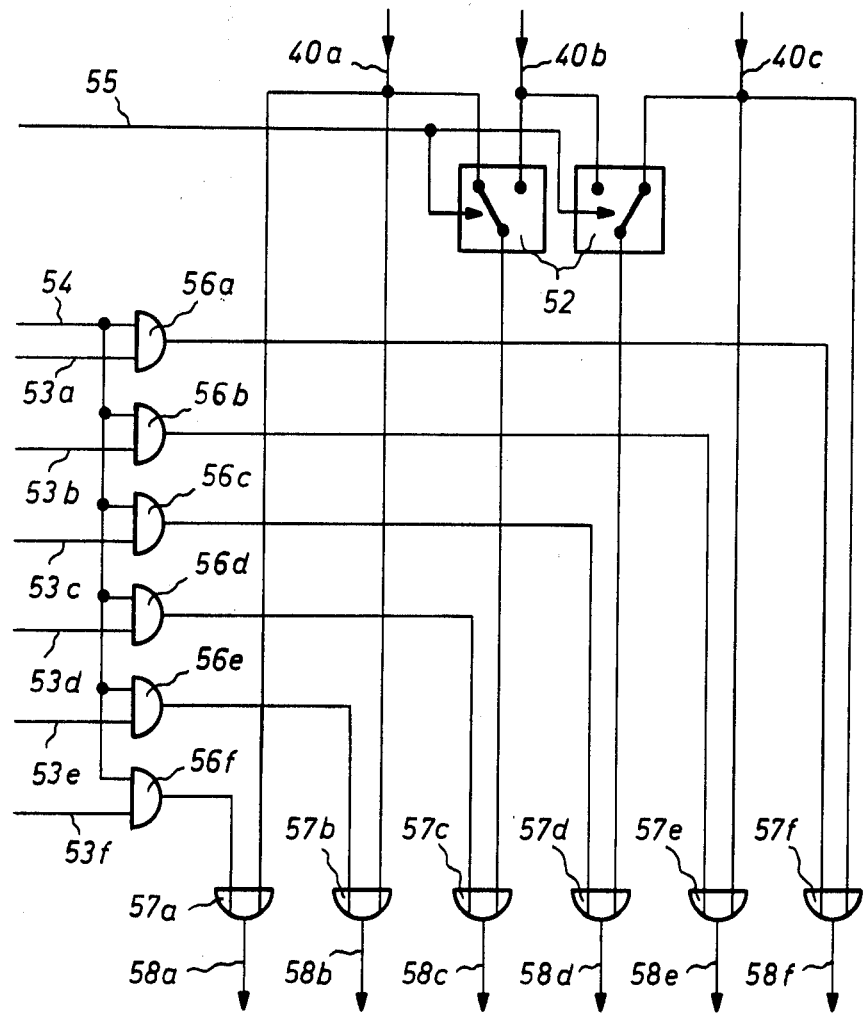
FIG. 6 shows a circuitry example for a gate circuit.

FIG. 6 shows an example of the circuit 18 (FIG. 1) which unites raster signals and refined line signals before the recording in a suitable manner. Here as example again one proceeds from the fact that six recording beams are present. These can for example be light beams which, modulated by light modulators 50 (FIG. 2), record on light-sensitive film. The light modulators are controlled via the six lines 58a-f. These lines are outputs of six OR gates 57a-f, at whose inputs the raster information from the output lines 53a-f of the AND gates 56a-f and the inventively refined line information from the lines 40a-c (FIG. 4) converge. The raster information in each case stands at an input of the AND gates 56a-f; the other inputs lie parallel on line 54. Depending upon which logic signal is adjacent to line 54, according to the invention the raster information is either suppressed or not during the writing of a refined line pattern.

Two electronic change-over switches 52, here depicted for the sake of simplicity as mechanical switches, can change the grouping of the six recording signals 57a-f by means of driving of the switches 52 via line 55 selectively in three groups for each two neighbouring recording beams or in two groups for each three neighbouring recording beams.

Although the invention has been described with respect to preferred embodiments, it is not to be so limited as changes and modifications can be made which are within the full intended scope of the invention as defined by the appended claims.

We claim:

1. A method for combined reproduction of pictures and line drawings comprising the steps of optoelectronically scanning a picture original with a first scanning element and generating a first recording signal for the screened reproduction of said picture original, controlling a plurality of separately drivable recording beams by the first recording signal for forming raster dots for the screened reproduction of said picture original, said plurality of recording beams having a finer resolution than the scanning element, optoelectronically scanning a line drawing original with a second scanning element and generating a second recording signal for a refined line reproduction of said line drawings and controlling said plurality of recording beams by the second recording signal, wherein for refined reproduction of said line drawing original the recording beams are individually controlled by the second recording signal.

2. A method for combined reproduction of pictures and line drawings comprising the steps of optoelectronically scanning a picture original with a first scanning element and generating a first recording signal for the screened reproduction of said picture original, controlling a plurality of separately drivable recording beams by the first recording signal for forming raster dots for the screened reproduction of said picture originals, said plurality of recording beams having a finer resolution than the scanning element, optoelectronically scanning a line drawing original with a second scanning element and generating a second recording signal for refined line reproduction of said line drawing original, and controlling said plurality of recording beams by the second recording signal wherein to produce a refined reproduction of said line drawing original and the recording beams are combined into groups and are driven by groups.

3. Apparatus for the combined reproduction of pictures and line drawings, comprising, a first optoelectronically scanning element for generating a first recording signal for the screened reproduction of said picture. a plurality of separately drivable recording beams, controlled by said first recording signal for generating raster dots for the screened reproduction of said picture original, a second optoelectronically scanning element for generating a second recording signal for the line reproduction of the line drawing original, and a switching means for connecting the first recording signal to the plurality of recording beams for forming raster dots for recording of the picture element and for connecting the second recording signal to the recording beams for forming a line reproduction of the line drawings by separately driving said beams.

4. Apparatus for the combined reproduction of pictures and line drawings comprising, a first optoelectronically scanning element for generating a first recording signal for the screened reproduction of said picture, a plurality of separately drivable recording beams, controlled by said first recording signal for generating raster dots for the screened reproduction of said picture original, a second optoelectronically scanning element for generating a second recording signal for the line reproduction of the line drawing original, and a switching means for connecting the first recording signal to the plurality of recording beams for forming raster dots for recording of the picture element and for connecting the second recording signal to the recording beams for forming a line reproduction of the line drawings by combining and driving said recording beams by groups.

* * * * *